United States Patent [19]

DeCaro

[11] 4,375,119

[45] Mar. 1, 1983

[54] FLOATING PLATE HOLDER INSTALLATION TOOL

[75] Inventor: Charles J. DeCaro, Pittsburgh, Pa.

[73] Assignee: Textron Inc., Providence, R.I.

[21] Appl. No.: 232,992

[22] Filed: Feb. 9, 1981

[51] Int. Cl.³ .............................................. B23P 19/04

[52] U.S. Cl. ........................................ 29/240; 81/435; 227/149

[58] Field of Search ....................... 227/9, 10, 11, 149; 81/37, 57, 435; 29/809, 240

[56] References Cited

U.S. PATENT DOCUMENTS 3,894,426 7/1975 Kopf ..................................... 227/10

4,201,325 6/1980 Jochum .................................. 227/9

*Primary Examiner*—Mark Rosenbaum

*Assistant Examiner*—Timothy V. Eley

*Attorney, Agent, or Firm*—Webb, Burden, Robinson and Webb

[57] ABSTRACT

An attachment for a power driven installation tool for a threaded fastener and a stress plate includes a barrel assembly connectable at a first end to the driver and terminating in an outer barrel at a second end. The outer barrel terminates in a stress plate holder and the stress plate holder is free to move with respect to the rest of the tool. In a preferred embodiment, a floating barrel is positioned for slidable movement within the distal end of the outer barrel and a stress plate holder is rigidly secured to the floating barrel and external of the outer barrel.

9 Claims, 13 Drawing Figures

FLOATING PLATE HOLDER INSTALLATION TOOL

BACKGROUND OF THE INVENTION

My invention relates to installation tools and, more particularly, to an installation tool having a barrel assembly which is used to install fasteners and stress plates into insulation on a metal roof deck.

In my copending United States patent application Ser. No. 124,233, filed Feb. 25, 1980, entitled "Fastener Plate and Assembly", I disclose a plastic stress plate and a fastener for use in securing insulation to metal decking. The plastic stress plate includes a hub through which the fastener can be driven. After the fastener passes through the hub and the insulation, it tends to dwell on the metal deck top until penetration takes place. During this period the threads within the hub can strip as a fastener turns seeking to drill and tap the metal deck top. The stripped condition of the plate riding on the smooth or threaded portion of the screw shank affords little resistance for movement between the two components. Therefore, the headed portion of the threaded fastener can more easily pop away from the stress plate or the recess in the stress plate. This can create possible damage to the upper ply of material applied over the insulation. If someone walks on the roof or rolls a rubber wheeled cart on the roof, which is often necessary on industrial buildings, the fastener tends to pop up from the roof. Normally, the uppermost thread terminates that movement, but if too long of an unthreaded portion exists, damage can be done to the roof.

This stripping of the threads in the hub of the plastic stress plate can be avoided by providing an unthreaded portion on the screw which is free to idle in the hub as drilling and tapping take place on the deck top. The unthreaded portion must be outside the barrel so as to be accessible. Further, the plastic plate should rest on the first thread so the fastener and plate cannot move relative to each other. As the demand for thicker and thicker insulation increases, increased screw lengths must be provided and it is difficult to provide a screw having an unthreaded portion properly positioned within the hub as the fastener dwells on the deck top. For all of these reasons, it has been difficult to get building erectors to use screws in such an application even though screws are a logical choice.

Another problem associated with longer screws and thicker insulation is the difficulties encountered in driving such a fastener. In my copending application now U.S. Pat. No. 4,295,394, issued Oct. 20, 1981, I disclose an installation tool barrel assembly capable of handling such long fasteners. However, that installation tool does not of itself prevent the problems associated with the popping up of fasteners.

SUMMARY OF THE INVENTION

I have now improved upon the installation tool defined in my copending application which is used to drive the screw and stress plate defined in my other copending application directed to a fastener and stress plate. I now provide a plate holder which holds the plastic stress plate and in which the plate holder is free to move with respect to the rest of the tool. This permits the screw to always move to a position where the unthreaded portion of the screw is in the hub during the period when the fastener dwells on the deck top. Even with softer and thicker insulation and single ply top covering, I am now able to install a screw and stress plate in a manner so that the screw will not push out of the plate because of stripped threads in the stress plate.

I have provided a terminal plate holder which is free to move with respect to the installation tool, thusly always positioning the unthreaded portion of the fastener in the hub of the stress plate. In one embodiment, a floating barrel is positioned for slidable movement within the distal end of an outer barrel. The floating barrel includes a shank positioned within the outer barrel and an enlarged section outside of the barrel which connects to the plate holder. In another embodiment, I provide the outer barrel terminating in an upper plate with the plate holder being positioned in axial spaced subjacent relationship to the upper plate. A plurality of pins extend through mating openings in the upper plate and the lower plate so the plates may move relative to each other.

DESCRIPTION OF THE PREFERRED EMBODIMENTS

Figure 1:
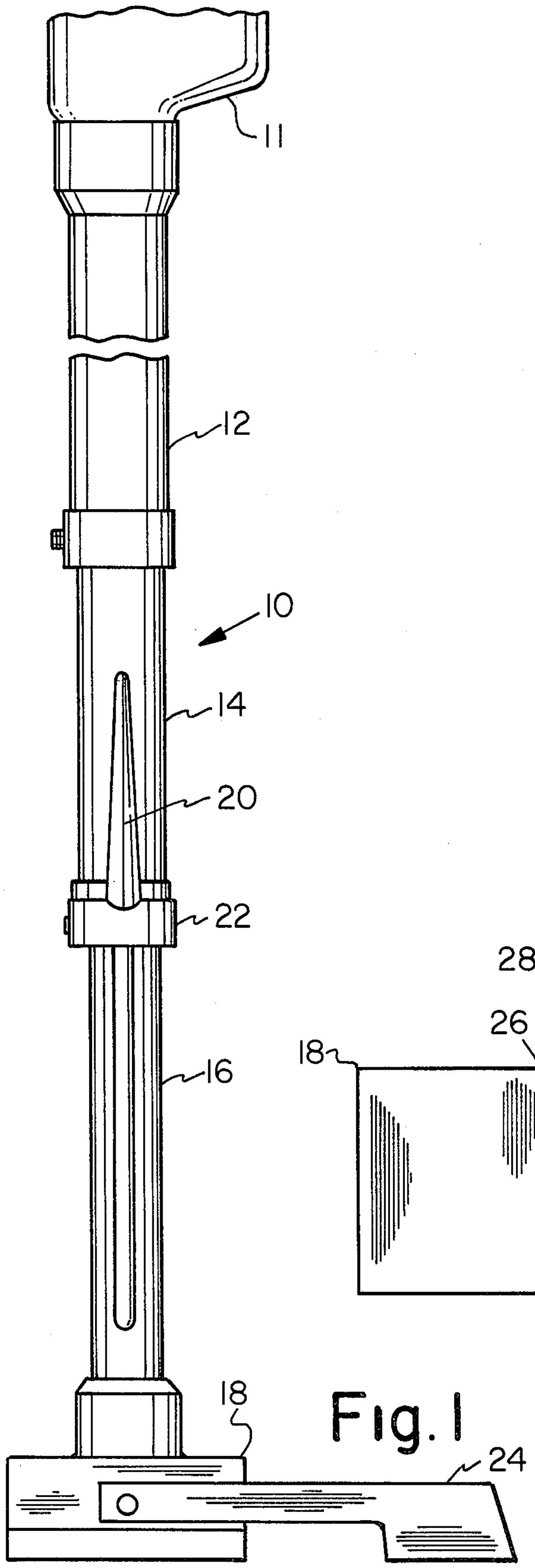
FIG. 1 is a side elevation of a complete barrel assembly attached to a driver.
Figure 12:
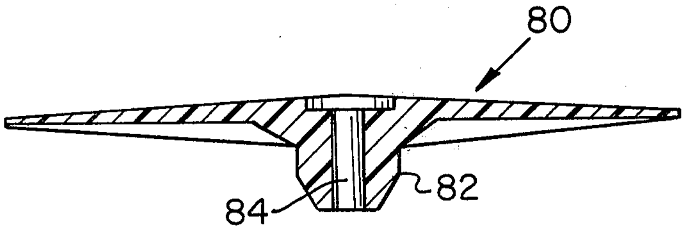
FIG. 12 is a section through a plastic stress plate.
Figure 13:
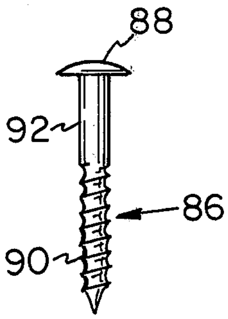
FIG. 13 is a side elevation of a screw adapted to be installed with the stress plate of FIG. 12.

The barrel assembly, generally designated 10, is adapted for attachment to a standard driving tool 11 of the type used to drive fasteners into a workpiece, FIG. 1. The particular type of fastener assembly for which the subject invention is principally suited is illustrated in FIGS. 12 and 13. The fastener system is used to secure insulation to a roof deck prior to the application of a final roofing layer or ply. The insulation is engaged by a stress plate 80 made of plastic (or metal in some cases) and having a hub 82 through which passes a central bore 84, FIG. 12. A fastener 86 (FIG. 13) is positioned in the bore 84 and is driven by the installation tool so that the threaded shank 90 of the fastener 86 threads the bore 84 through the hub 82 and in the final set position, the unthreaded shank 92 is housed within the bore 84.

The installation tool described hereinafter assures that the unthreaded shank 92 of the screw 86 is housed within the bore 84 of the hub 82 while the threaded portion 90 of the screw 86 dwells on and ultimately drills and taps through the metal roof deck. The barrel assembly 10 includes an outer sleeve 12 adapted for connection to the driving tool 11, FIG. 1. An inner sleeve 14 attaches to and is retractable to the outer sleeve 12. An outer barrel 16 is retractably connected to the inner sleeve 14, and a workpiece pad 18 having a footrest 24 extending outward therefrom is connected to the distal end of the outer barrel 16. The entire barrel assembly contains a central bore extending the length thereof through which the driver element (not shown) functions to drive the fastener. A slot 20 has a starting point substantially midway of the length of the inner sleeve 14 and extends toward outer barrel 16. The slot 20 which forms the entrant means for the fastener increases in depth from its starting point to its terminal end where it terminates in a clear through opening 21 which communicates with the central bore, FIG. 2.

The pad 18, floating barrel 26 and plate holder 38 are connected to the distal end of outer barrel 16. Pad 18 is the terminal member of the barrel assembly which houses the floating barrel 26 and plate holder.

Figure 4:
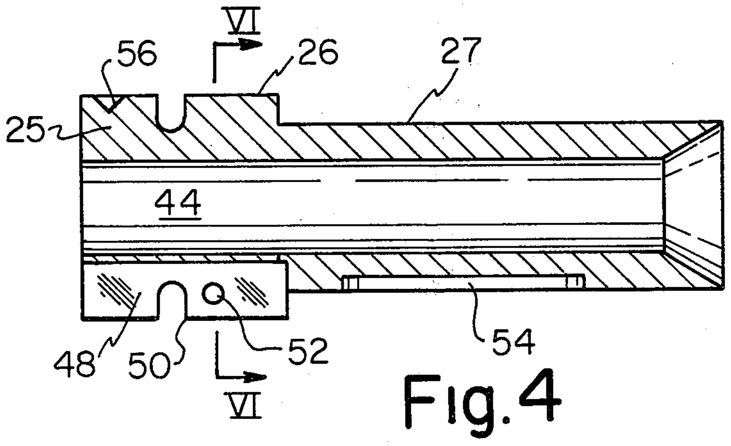
FIG. 4 is a section taken along the longitudinal center line of the floating barrel.
Figure 5:
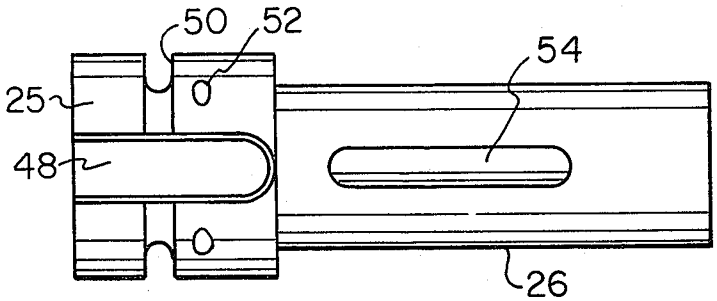
FIG. 5 is a side elevation of the floating barrel.

The floating barrel 26 includes a barrel shank 27 and an enlarged section 25, FIGS. 4 and 5. Shank 27 is housed within the distal end of outer barrel 16 and enlarged section 25 is outside of said distal end. Shank 27 includes a blind longitudinal slot 54 which is engaged by a dog point set screw 42 extending through the outer barrel wall, FIGS. 2 and 4. Floating barrel 26 is free to slide along dog point set screw 42 but is prevented from rotating within outer barrel 16. The length of movement of floating barrel 26 can be controlled by the axial extent of the slot 54.

Figure 6:
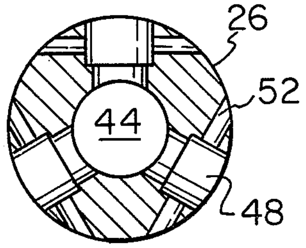
FIG. 6 is a section taken along section lines VI—VI of FIG. 4.

The enlarged outer section 25 of floating barrel 26 includes three longitudinal slots 48, a transverse O ring recess 50, three pin openings 52, dog point recesses 56 and a central bore 44 passing therethrough, FIGS. 4–6. Fastener guide means are connected to the enlarged section 25 by means of three fingers 34 pivotally connected in slots 48 and held by connecting pins 40 which extend through pin openings 52. The fingers 34 are held in place in guiding relationship to a fastener passing therethrough by means of O ring 32, FIGS. 2 and 3.

Figure 2:
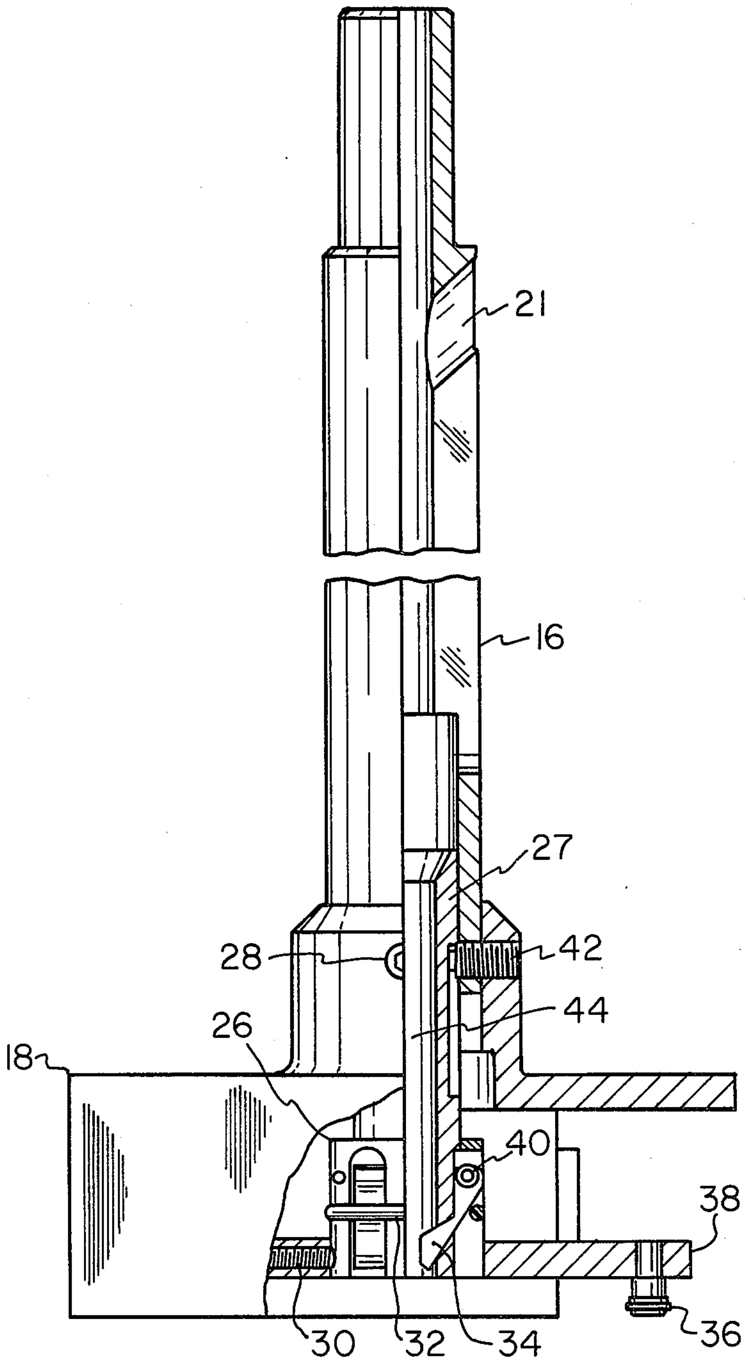
FIG. 2 is a side elevation of a portion of the barrel assembly in which one-half of the barrel assembly along the longitudinal center line is in section.
Figure 9:
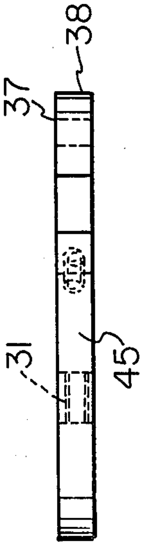
FIG. 9 is a side elevation of the plate holder.
Figure 10:
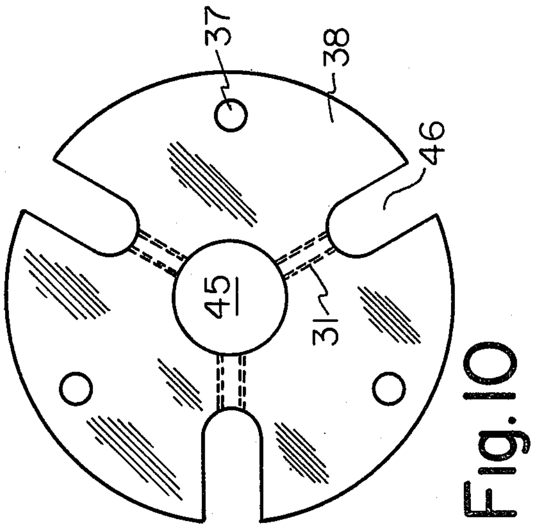
FIG. 10 is a plan view of the plate holder.

The stress plate holder 38 is connected to the enlarged section 25 of the floating barrel 26 by means of set screws 30 which fit into the dog points 56 recessed in the enlarged section 25, FIG. 2. Plate holder 38 includes radial openings 37 through which retaining posts 36 for the stress plate extend, FIGS. 2, 9 and 10.

Figure 3:
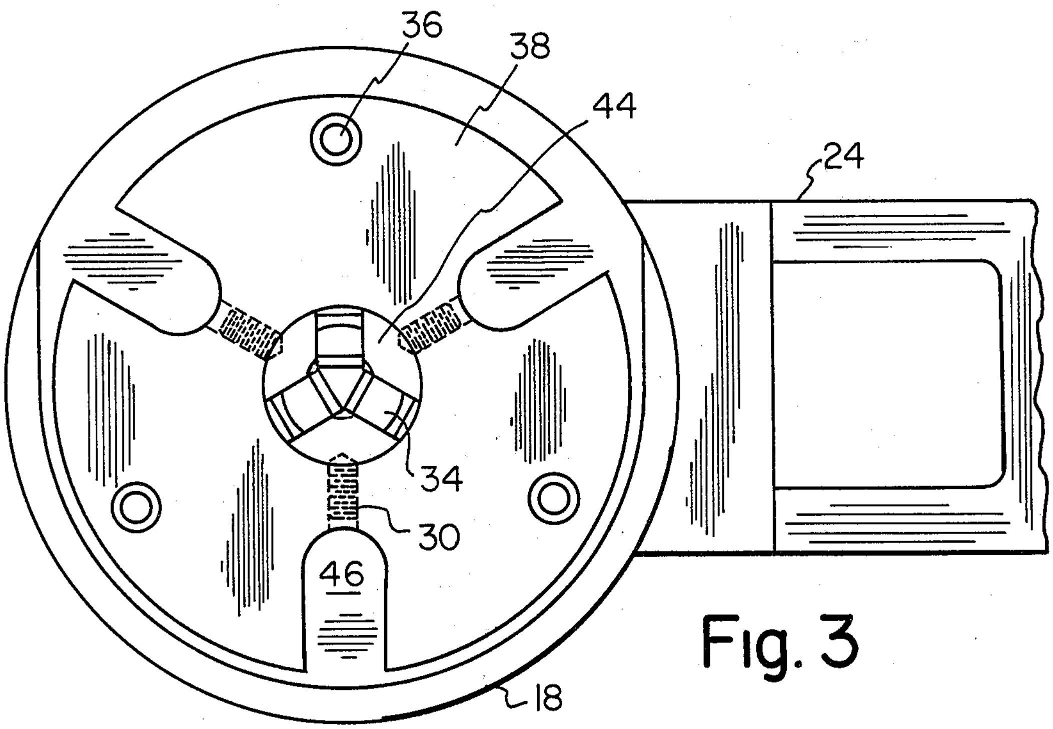
FIG. 3 is a bottom view of the barrel assembly of FIG. 2.
Figure 8:
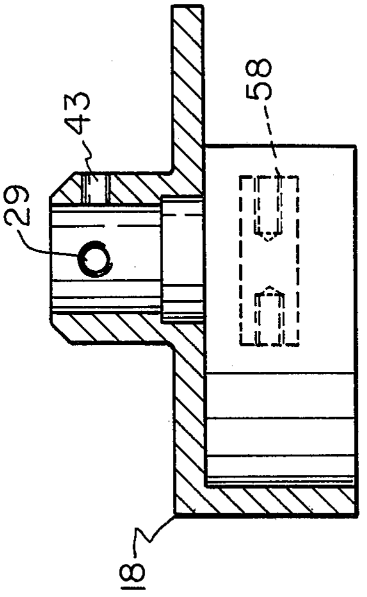
FIG. 8 is a section taken along section lines VIII—VIII of FIG. 7.
Figure 7:
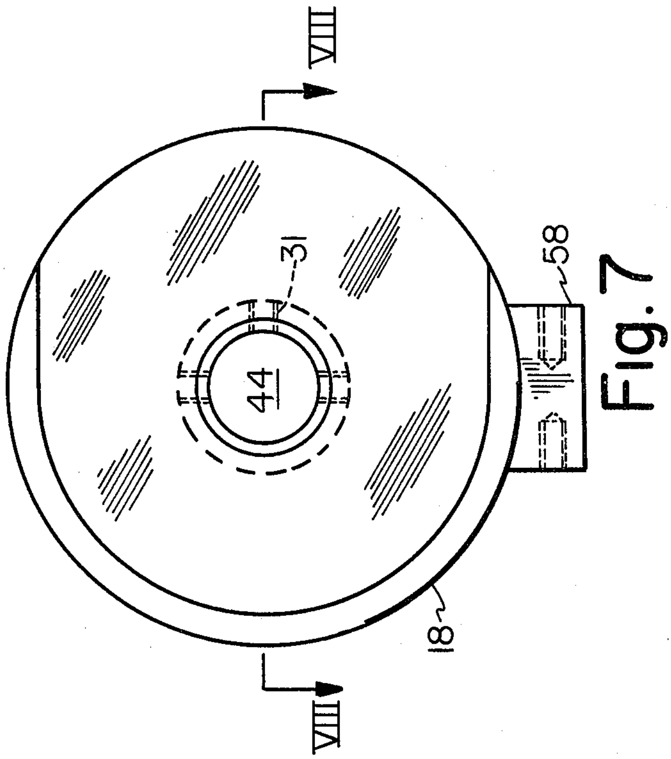
FIG. 7 is a bottom view of the pad which connects at the distal end of the barrel assembly.

The pad 18 includes a connecting flange 58 to which the foot pad 24 is attached, FIGS. 3, 7 and 8. Pad 18 is connected to outer barrel 16 by set screw 28 which threads into tap 29. A central bore 44 extends through pad 18 and is in registry with the bore of the barrel assembly and the bore 45 of the plate holder 38.

The floating plate 38, which is rigidly secured to the floating barrel 27, moves therewith and is free to move relative to the balance of the installation tool. Therefore, as long as a thread of the fastener is engaged in the hub and the fastener is turning, the plastic plate will lift until the plastic stress plate leaves the threads of the fastener and proceeds onto the unthreaded portion and thereafter the stress plate idles with respect to the screw in that position.

The installation tool can also be used on a fastener having an interrupted double thread as also disclosed in my patent application Ser. No. 124,233. In such a fastener the length must be longer than the single threaded screw by a distance equal to one hub length of the stress plate.

Breach loading tools of the type described herein characteristically require tool lengths to be increased by an amount which is twice the increase of the fastener. Because of energy conservation, thicker insulation requires longer fasteners. Therefore, the standard breach loading tool has been lengthened to the point where it is fatiguing to use because of the increased weight and bulkiness and the inability to apply body pressure to the tool during installation of the fastener. Further, when the stress plate includes a hub having an opening therethrough less than the fastener diameter, the screw must not extend beyond the end of the barrel or it will eject the stress plate from the tool. A modified form of my invention which alleviates these problems is shown in FIG. 11.

Figure 11:
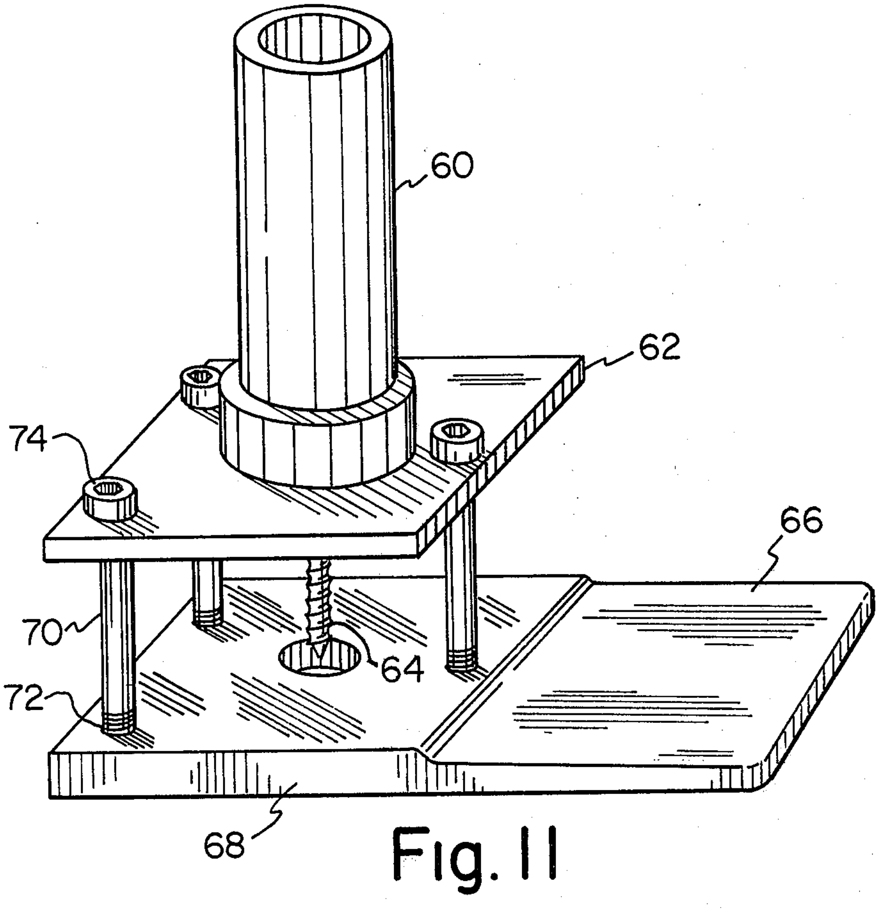
FIG. 11 is a perspective view of a modified form of the plate holder.

The outer barrel 60 terminates in a fixed upper plate 62, FIG. 11. The plate holder 68 with magnets for metal stress plates (not shown) or posts for plastic stress plates (not shown) is connected to footrest 66 which then becomes a portion of the floating plate holder 68. Shoulder screws 70 act as guide pins and are threaded to the plate holder at threaded tap 72. Shoulder screws 70 extend through openings in the upper fixed plate 62 and are headed at 74 (alternate means such as snap rings can also be employed) so that the plate holder 68 is free to move relative to the upper plate 62.

The floating plate holder of the earlier embodiment may also be connected directly to the footrest and the pad 18 of FIG. 2 may be eliminated.

While the embodiment of FIG. 11 can be used for any size fastener, it finds its biggest advantage where long fasteners 64 stick out of the barrel because of their undue length. In such a situation the upper plate 62 moves down as the fastener 64 penetrates the installation and the stress plate moves up the threaded fastener to the unthreaded portion as in the earlier embodiment. By merely changing the length of the posts or shoulder screws 70, any length fastener can be accommodated by the basic tool, and barrel lengths stay the same regardless of screw length. Further, the initial resistance to movement of the floating plate holder is slight and by the time the fastener actually penetrates the metal deck, the overall tool height has been reduced to a comfortable and easily operable level.

I claim:

1. In a power driven installation tool for installing threaded fasteners and stress plates by screwing a fastener through a stress plate and into a workpiece and including an outer barrel and a terminal plate holder connected thereto for retaining the stress plate as the fastener is screwed therethrough, the improvement comprises means for providing free movement of the plate holder relative to the outer barrel to permit the stress plate to ride up the fastener as the fastener dwells on the workpiece during installation.

2. The improvement of claim 1, said means comprising a floating barrel positioned for slidable movement within a distal end of the outer barrel, said floating barrel connected to the plate holder.

3. The improvement of claim 1, said means comprising said plate holder freely connected to said outer barrel.

4. The improvement of claim 3, said outer barrel terminating in an upper plate, said plate holder positioned in axially spaced relationship from said upper plate and at least one post radially positioned from a central aperture in said plate holder, said post extending through an opening in said upper plate to connect said upper plate to the plate holder and permit free relative movement therebetween.

5. The improvement of claim 4, including a plurality of posts.

6. An attachment for a driver to form a power driven installation tool for a threaded fastener and a stress plate comprising:

A. a barrel assembly connectable at a first end to such a driver and terminating in an outer barrel at a second end, said barrel assembly having a bore axially therethrough;

B. means for introducing a fastener into the barrel assembly;

C. a floating barrel positioned for free slidable movement within the bore of a second end of the outer barrel; and D. a stress plate holder rigidly secured to the floating barrel and external of the outer barrel.

7. The attachment of claim 6 including fastener guide means secured to the floating barrel and extending into a floating barrel bore.

8. The attachment of claim 6, said floating barrel comprising a shank and a flange, said shank extending into said barrel bore and said flange connected to said plate holder external of said outer barrel.

9. The attachment of claim 8, said shank including a blind axial slot, said outer barrel including a threaded opening to accommodate a set screw which extends into the shank slot to prevent rotation of said slot.

* * * * *